United States Patent
Kopp et al.

[11] Patent Number: 6,112,874
[45] Date of Patent: Sep. 5, 2000

[54] HYDROMECHANICAL COUPLING WITH TORQUE-LIMITING AND TEMPERATURE-SENSITIVE UNLOADING FEATURES

[75] Inventors: Thad Kopp, Shelby Township, Mich.; Sankar K. Mohan, Syracuse; Timothy M. Burns, Jordan, both of N.Y.

[73] Assignee: New Venture Gear, Inc., Troy, Mich.

[21] Appl. No.: 09/229,378

[22] Filed: Jan. 12, 1999

[51] Int. Cl.[7] .................................................. F16H 48/26
[52] U.S. Cl. ...................................... 192/85 AA; 192/35
[58] Field of Search .................................. 192/35, 70.12, 192/70.2, 85 AA, 82 T, 113.3, 113.34, 103 F; 475/88

[56] References Cited

U.S. PATENT DOCUMENTS

| | | |
|---|---|---|
| 4,031,780 | 6/1977 | Dolan et al. . |
| 4,650,028 | 3/1987 | Eastman et al. . |
| 5,148,900 | 9/1992 | Mohan . |
| 5,176,235 | 1/1993 | Williams . |
| 5,221,101 | 6/1993 | Okobu et al. ........................... 180/247 |
| 5,234,091 | 8/1993 | Kobayashi et al. ................ 192/85 CA |
| 5,310,388 | 5/1994 | Okcuoglu et al. . |
| 5,358,454 | 10/1994 | Bowen et al. . |
| 5,536,215 | 7/1996 | Shaffer et al. . |
| 5,595,214 | 1/1997 | Shaffer et al. . |
| 5,611,746 | 3/1997 | Shaffer . |
| 5,649,459 | 7/1997 | Murakami et al. . |
| 5,704,863 | 1/1998 | Zalewski et al. . |
| 5,735,764 | 4/1998 | Shaffer et al. . |
| 5,779,013 | 7/1998 | Bansbach . |
| 5,827,145 | 10/1998 | Okcuoglu . |

*Primary Examiner*—Charles A Marmor
*Assistant Examiner*—Saul Rodriquez
*Attorney, Agent, or Firm*—Narness, Dickey & Pierce, P.L.C.

[57] ABSTRACT

A hydraulic coupling is disclosed for use in motor vehicle driveline applications to rotatively couple a pair of rotary members. The hydraulic coupling includes a multi-plate clutch assembly operatively connecting the two rotary members and an actuator assembly for actuating the clutch assembly in response to and as a function of speed differentiation between the two rotary members. The actuator assembly includes a hydraulic pump, a piston disposed in a piston chamber, and a fluid control system for controlling the fluid pressure supplied to the piston chamber by the hydraulic pump to control the clutch engagement force exerted by the piston on the clutch assembly. The fluid control system includes a pressure relief valve operable for limiting the fluid pressure in the piston chamber to a predetermined maximum pressure value. The fluid control system also includes a thermal unload valve operable for releasing the fluid pressure within the piston chamber when the fluid temperature exceeds a predetermined maximum temperature value.

22 Claims, 4 Drawing Sheets

HYDROMECHANICAL COUPLING WITH TORQUE-LIMITING AND TEMPERATURE-SENSITIVE UNLOADING FEATURES

BACKGROUND OF THE INVENTION

The present invention relates generally to hydraulic couplings for use in motor vehicle driveline applications. More specifically, the hydraulic coupling includes a hydraulic pump, a transfer clutch coupled between a pair of rotary members, and a fluid distribution system operable for controlling actuation of the transfer clutch.

Hydraulic couplings are used in a variety of motor vehicle driveline applications for limiting slip and transferring drive torque between a pair of rotary members. In all wheel drive applications, hydraulic couplings have been used to automatically control the transfer of drive torque from a driven member to a non-driven member in response to speed differentiation therebetween. In limited slip applications, such as used in association with a differential in an axle assembly, full-time transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 5,649,459, 5,704,863 and 5,779,013.

Due to the advent of increased consumer demand for motor vehicles with traction control systems, hydraulic couplings are currently being used in a variety of driveline applications. Nevertheless, such hydraulic couplings are still susceptible to improvements that may enhance their performance and cost. With this in mind, a need exists to develop improved hydraulic couplings which advance the art.

SUMMARY OF THE INVENTION

Accordingly, it is an object of the present invention to provide a hydraulic coupling for use in motor vehicle driveline applications for rotatively coupling a pair of rotary members to limit speed differentiation and transfer drive torque therebetween.

In accordance with this object, the hydraulic coupling includes a multi-plate clutch assembly operatively connecting a pair of rotary members, and an actuator assembly for actuating the clutch assembly in response to and as a function of speed differentiation between the two rotary members. The actuator assembly includes a hydraulic pump, a piston disposed in a piston chamber, and a fluid control system for controlling the fluid pressure supplied to the piston chamber by the hydraulic pump to control the clutch engagement force exerted by the piston on the clutch assembly. The fluid control system includes a pressure relief valve operable for limiting the fluid pressure in the piston chamber to a predetermined maximum pressure value. The fluid control system also includes a thermal unload valve operable for releasing the fluid pressure within the piston chamber when the fluid temperature exceeds a predetermined maximum temperature value.

As a further feature of the hydraulic coupling, the pressure relief valve is a pressure-sensitive valve element mounted to the piston for movement from a first position to a second position when the fluid pressure in piston chamber exceeds the maximum pressure value. In its first position, the pressure-sensitive valve element blocks flow through a pressure discharge port extending through the piston. In its second position, the pressure-sensitive valve element permits flow through the discharge port for limiting the fluid pressure in the piston chamber to the maximum pressure value, thereby limiting the maximum torque transmitted through the clutch assembly.

As another feature of the hydraulic coupling, the thermal unload valve is a temperature-sensitive valve element mounted to the piston for movement from a first position to a second position when the fluid temperature in the piston chamber exceeds the maximum temperature value. In its first position, the temperature-sensitive valve element blocks flow through a dump port extending through the piston. In its second position, the temperature-sensitive valve element permits flow through the dump port to vent the piston chamber and release the clutch assembly.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE INVENTION

The present invention is directed to a hydromechanical limited slip and torque transfer apparatus, hereinafter referred to as a hydraulic coupling. Driveline applications for the hydraulic coupling include, but are not limited to, limited slip axle differentials, power take-offs and in-line coupling for all-wheel drive vehicles, on-demand couplings and limited slip differentials in four-wheel drive transfer cases, limited slip differentials in transaxles, and any other driveline apparatus operable for transferring drive torque and/or limiting slip between two rotary members.

Figure 1:
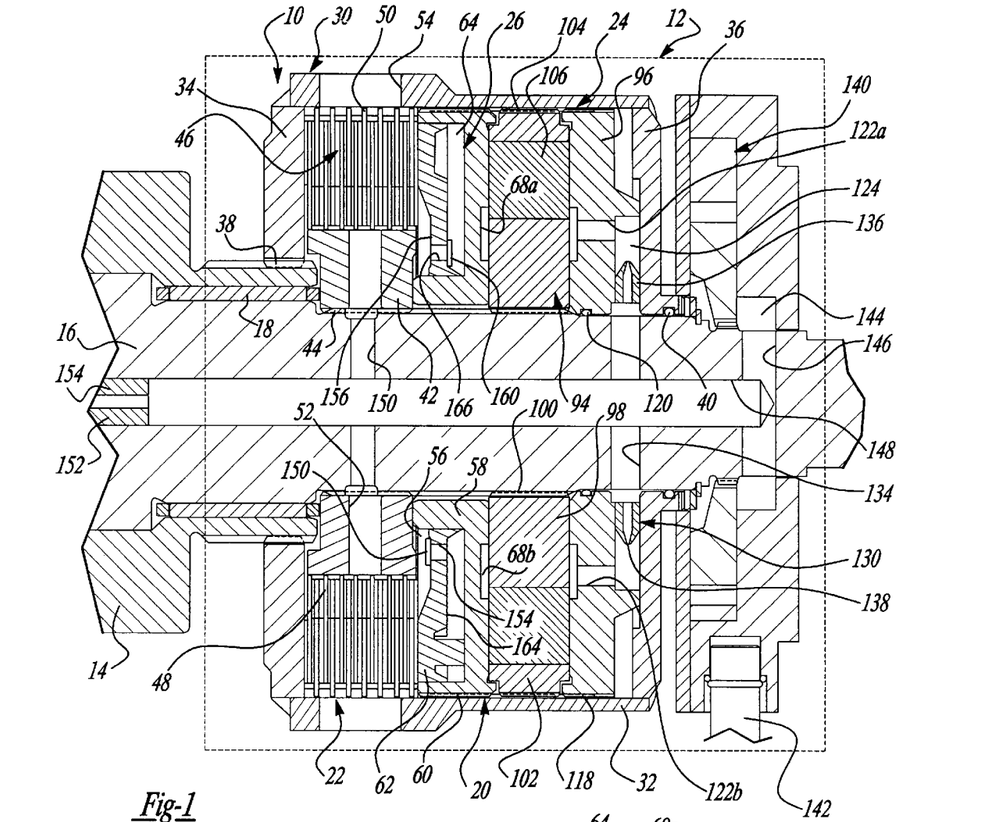
FIG. 1 is a sectional view illustrating a hydraulic coupling according to the present invention operatively coupled between first and second rotary shafts.

Referring initially to FIG. 1 of the drawings, a hydraulic coupling according to the preferred embodiment of the present invention is generally identified with reference numeral 10. As shown, hydraulic coupling 10 is located in a driveline apparatus 12 and is operatively coupled between a first rotary member, hereinafter referred to as first shaft 14, and a second rotary member, hereinafter referred to as second shaft 16. Shafts 14 and 16 are rotatable relative to one another, with first shaft 14 being supported by bearing 18 for rotation relative to second shaft 16. As will become apparent below, hydraulic coupling 10 is adapted to automatically and progressively couple shafts 14 and 16 in response to rotational speed differences therebetween.

In general, hydraulic coupling 10 is illustrated to include an actuator assembly 20 operably arranged to actuate a transfer clutch 22 for automatically and progressively transferring drive torque to the slower rotating shaft in response to excessive speed differentiation therebetween. Actuator assembly 20 includes a hydraulic pump 24 and a piston assembly 26 while transfer clutch 22 is a multi-plate clutch assembly. Both actuator assembly 20 and transfer clutch 22 are confined within a cover assembly 30. Cover assembly 30 includes a cylindrical outer drum 32 and first and second cover plates 34 and 36, respectively, secured (i.e., welded) to opposite ends of outer drum 32. First cover plate 34 is shown fixed via a splined connection 38 to first shaft 14 such that cover assembly 30 rotates with first shaft 14. An O-ring seal 40 permits second cover plate 36 of cover assembly 30 to rotate relative to second shaft 16 while providing a fluid-tight seal therebetween. Thus, an internal drum chamber is formed between cover assembly 30 and second shaft 16.

Transfer clutch 22 is located in the drum chamber and includes a clutch hub 42 fixed via a splined connection 44 to second shaft 16 and a multi-plate clutch pack 46. Clutch pack 46 includes a plurality of inner clutch plates 48 splined to clutch hub 42 and which are alternately interleaved with a plurality of outer clutch plates 50 splined to outer drum 32. Lubrication ports 52 and 54 formed through clutch hub 42 and outer drum 32, respectively, are provided for supplying hydraulic fluid to a portion of the drum chamber, hereinafter referred to as clutch chamber 56, for lubricating and cooling clutch pack 46.

Piston assembly 26 is comprised of a piston housing 58 that is fixed via a splined connection 60 for rotation with outer drum 32, and a piston 62 disposed in an annular piston chamber 64 formed in piston housing 58. Piston 62 has a cover material, such as rubber, bonded thereto to provide for sealed sliding engagement with respect to inner and outer edge surfaces of piston chamber 64. Thus, piston 62 is supported for axial sliding movement within piston chamber 64 for applying a compressive clutch engagement force on clutch pack 46, thereby transferring drive torque from second shaft 16 (via clutch hub 42) to first shaft 14 (via cover assembly 30) or vise versa. The amount of drive torque transferred is progressive in that it is proportional to the magnitude of the clutch engagement force exerted by piston 62 on clutch pack 46 which, in turn, is a function of the fluid pressure within piston chamber 64. In this regard, the magnitude of the fluid pressure delivered by hydraulic pump 24 to piston chamber 64 is largely a function of the speed differential (i.e., "$\Delta$RPM") between first shaft 14 and second shaft 16.

Piston housing 58 has a valving arrangement associated therewith that is operable for controlling the delivery of fluid under pressure from hydraulic pump 24 to piston chamber 64. As best seen from FIG. 2, a pair of transfer ports 66a and 66b are formed through piston housing 58 and extend between and communicate with a corresponding one of pump outlet slots 68a and 68b and piston inlet slots 70a and 70b. In addition, a check valve 72 is mounted by rivets 74 in a shallow bridge groove 76 which communicates with both piston inlet slots 70a and 70b. Preferably, check valve 72 is a reed-type valve element that is symmetrical relative to a central alignment tab 78. Based on the direction of relative rotation between shafts 14 and 16 (which results in a corresponding directional rotation of hydraulic pump 24 in a first direction), one terminal end 80a of check valve 72 will resiliently deflect to an "open" position away from piston housing 58 and its corresponding transfer port 66a due to the pumping action of hydraulic pump 24 for permitting the flow of hydraulic fluid from the corresponding pump outlet slot 68a into piston chamber 64. Concurrently, the other terminal end 80b of check valve 72 is maintained in a "closed" position relative to piston housing 58 for inhibiting the discharge of hydraulic fluid from piston chamber 64 into the other pump outlet slot 68b through transfer port 66b. During the opposite direction of relative rotation between shafts 14 and 16, the open and closed positions mentioned above for check valve 72 are reversed with respect to transfer ports 66a and 66b. Upon cessation of the pumping action, both terminal ends 80a and 80b of check valve 72 are biased to return to their respective closed positions for maintaining a supply of fluid in piston chamber 64. Thus, check valve 72 functions as a normally-closed check valve. Optionally, separate check valves can be used in association with transfer ports 66a and 66b if so desired.

Figure 2:
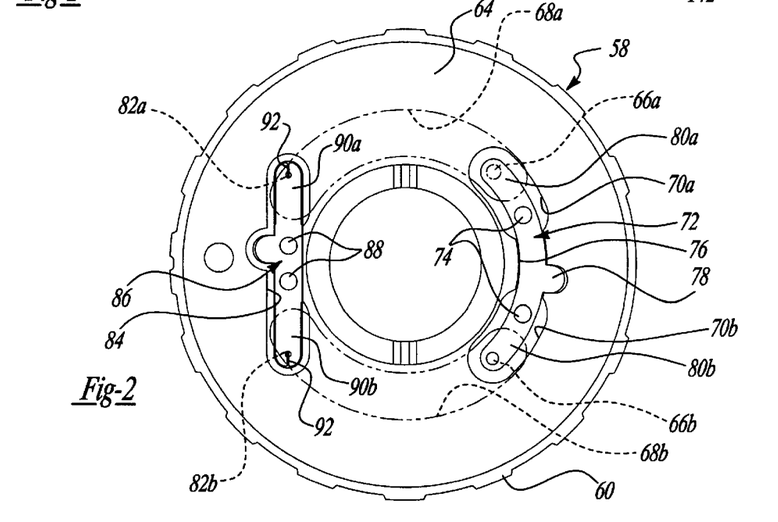
FIG. 2 is a side view of the piston housing associated with the hydraulic coupling.

With continued reference to FIG. 2, piston housing 58 also includes a pair of outlet ports 82a and 82b, which communicate with a corresponding one of pump outlet slots 68a and 68b and a chamfered bridge slot 84. The valving arrangement associated with piston housing 58 further includes a control valve 86 mounted by rivets 88 within bridge slot 84 and which is operable for setting the predetermined minimum pressure within piston chamber 64 at which transfer clutch 22 is initially actuated. Control valve 86 is preferably a bimetallic valve element that is normally maintained with both of its terminal ends 90a and 90b in an "open" position displaced from piston housing 58 for permitting flow of hydraulic fluid into piston chamber 64 through one of outlet ports 82a and 82b while also permitting flow of hydraulic fluid out of piston chamber 64 to a lower pressure section of hydraulic pump 24 through the other of outlet ports 82a and 82b. Since control valve 86 is a bimetallic valve element, the different thermal expansion coefficients of its laminated valve strips cause its terminal ends to move as the temperature varies for controlling discharge flow through outlet ports 82a and 82b regardless of changes in the viscosity of the hydraulic fluid caused by such temperature variations. However, once the speed differential exceeds a predetermined minimum $\Delta$RPM value, the pumping action of hydraulic pump 24 causes the fluid in piston chamber 64 to exceed a predetermined minimum pressure value, whereby terminal end of control valve 86 controlling flow out of piston chamber 64 moves to its "closed" position against piston housing 66 for inhibiting fluid flow through the corresponding outlet port. As such, a significant pressure increase occurs in piston chamber 64 which causes piston 62 to apply a corresponding clutch engagement force on clutch pack 46 and actuate transfer clutch 22. As is also seen, terminal ends 90a and 90b of control valve 86 are each formed to include a small bleed passage or slot 92 that permit a small amount of bleed flow out of piston chamber 64 even when control valve 86 is closed. This continuous bleed flow provides a gradual release of the fluid pressure in piston chamber 64 after cessation of the pumping action for disengaging transfer clutch 22. As noted, opposite relative rotation between shafts 14 and 16 will result in the opened and closed positions of terminal ends 90a and 90b of control valve 86 being reversed.

Figure 3:
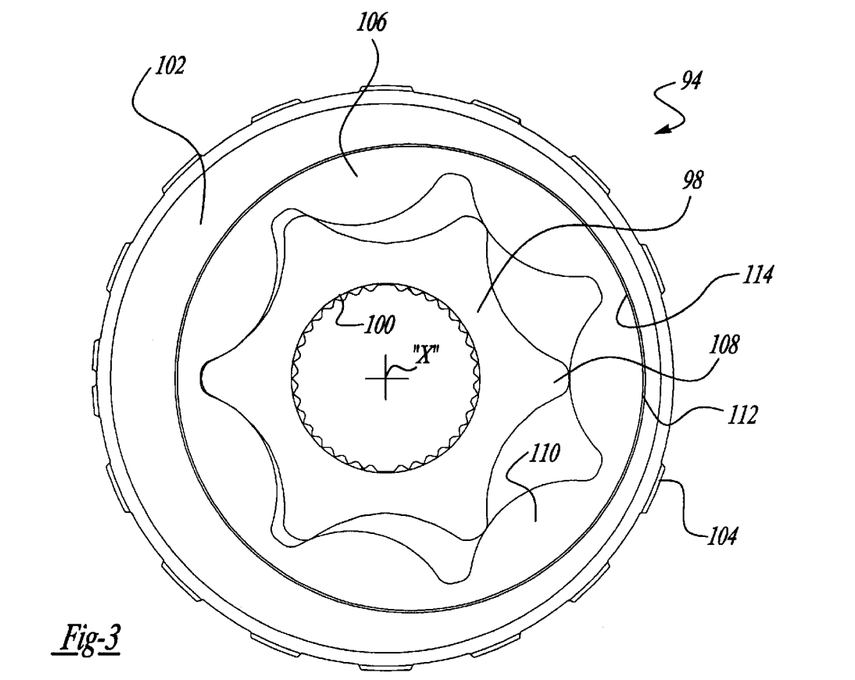
FIG. 3 is a side view of the hydraulic pump associated with the hydraulic coupling.

As noted, hydraulic pump 24 is operable for pumping hydraulic fluid through transfer ports 66a and 66b and into piston chamber 64 for actuating transfer clutch 22 in response to the magnitude of the differential rotation $\Delta$RPM between shafts 14 and 16. Hydraulic pump 24 is installed in the cover assembly 30 and, preferably, includes a gerotor pump assembly 94 and a pump housing 96. Gerotor pump assembly 94 is a bidirectional arrangement including a pump ring 98 that is fixed via a splined connection 100 to second shaft 16, an eccentric ring 102 that is fixed via a splined connection 104 to outer drum 32, and a stator ring 106 that is operably disposed therebetween. Pump ring 98 has a plurality of external teeth 108 that rotate concentrically relative to shaft 16 about a common rotational axis, as denoted by axis line "X". Stator ring 106 includes a plurality of internal lobes 110 and has an outer circumferential edge surface 112 that is journally rotatably supported within a circular internal bore 114 formed in eccentric ring 102. Internal bore 114 is offset from the rotational axis "X" such that, due to meshing of internal lobes 110 of stator ring 106 with external teeth 108 of pump ring 98, relative rotation between pump ring 98 and eccentric ring 102 causes eccentric rotation of stator ring 106. Based on the direction of relative rotation, this eccentric rotary arrangement results in a pumping action for supplying fluid from one of pump inlet slots 116a and 116b formed in pump housing 96 to a corresponding one of pump outlet slots 68a and 68b formed in piston housing 58. Preferably, stator ring 106 has a number of lobes 110 that is one more than the number of teeth 108 provided on pump ring 98.

Figure 4:
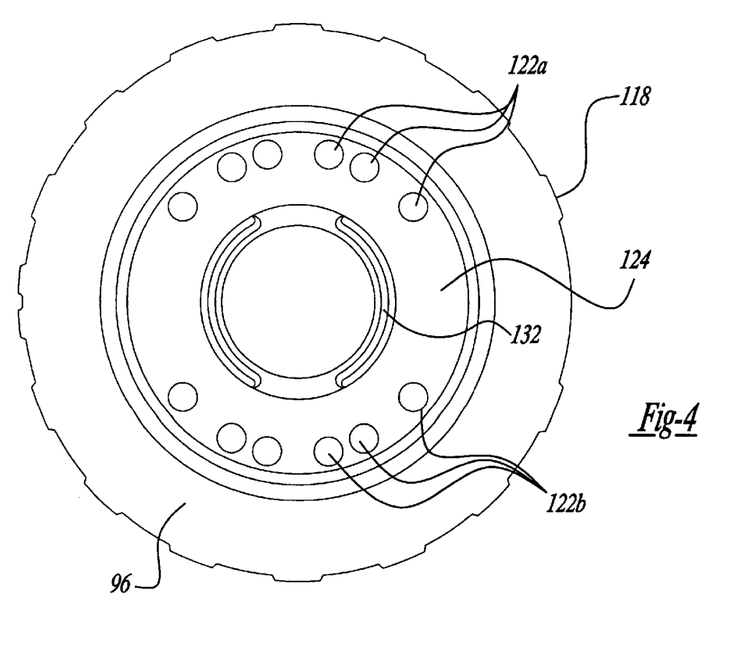
FIG. 4 and 5 are opposite side views of the pump housing associated with the hydraulic coupling.
Figure 5:
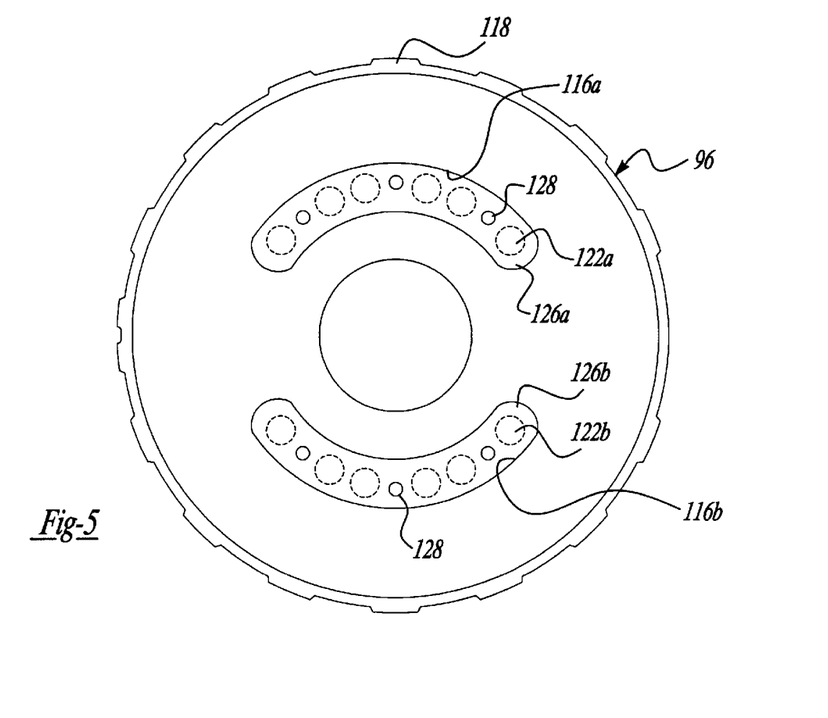

Gerotor pump assembly 94 is operably installed between piston housing 58 and pump housing 96. Pump housing 96 is likewise shown to have its outer peripheral surface fixed via a splined connection 118 for rotation with outer drum 32 while its inner peripheral surface is journally supported for rotation relative to second shaft 16 and is sealed relative thereto by an O-ring seal 120. Pump housing 96 is formed to include a series of inlet ports 122a and 122b formed respectively within pump inlet slots 116a and 116b to provide fluid communication with an annular supply chamber 124 located on a supply side of gerotor pump assembly 94 and which is defined between pump housing 96 and second cover plate 36. Check valves 126a and 126b are mounted by rivets 128 within corresponding pump inlet slots 116a and 116b for controlling the delivery of fluid from supply chamber 124 through inlet ports 122a and 122b into pump inlet slots 116a and 116b. Check valves 126a and 126b are preferably elongated reed valve elements which overlie inlet ports 122a and 122b and which are movable on rivets 128 from a "closed" position abutting pump housing 96 to an "open" position displaced from pump housing 96 in response to pumping action of gerotor pump assembly 94. Rotation in a first direction causes check valve 126a to move to its open position while check valve 126b is maintained in its closed position. Opposite rotation causes opposite movement of check valves 126a and 126b. Upon cessation of the pumping action, check valves 126a and 126b return to their normally closed positions for maintaining a supply of fluid within pump inlet slots 116a and 116b.

An inlet check valve 130 is mounted on a bifurcated rim segment 132 of pump housing 96 to permit fluid to be drawn from an inlet passage 134 formed in second shaft 16 into supply chamber 124. Check valve 130 is a ring member having a pair of resiliently deformable "duckbill" valve segments 136 with inlet slits 138 formed therein. Pumping action of hydraulic pump 24 causes slits 138 to open and permit fluid to be drawn from inlet passage 134 into supply chamber 124. Slits 138 are normally closed to prevent the flow of fluid from supply chamber 124 into inlet passage 134. Thus, check valve 130 is normally closed for maintaining a supply of fluid in supply chamber 124.

Driveline apparatus 12 is shown in FIG. 1 to further include a supply pump 140 that is operable for drawing fluid from a sump provided within driveline apparatus 12 through an inlet tube 142 and pumping the fluid to a discharge reservoir 144. In particular, supply pump 140 is a shaft-driven hydraulic pump, such as a second gerotor pump assembly, which pumps fluid from discharge reservoir 144 into a fluid pathway formed in second shaft 16 for delivery to inlet passage 134 and lubrication port 52 in clutch hub 42. The fluid pathway is shown to include a radial bore 146, a central longitudinal bore 148 and radial bore 150. A plug 152 with an orifice 154 is retained in bore 148 to direct fluid into inlet passage 134 and radial bore 150. According to an optional construction, check valve 130 could be a reed-type valve element movable between open and closed positions relative to an inlet port formed through second cover plate 36 to permit fluid to be drawn into supply chamber 124 directly from the sump within driveline apparatus 12 in those application in which supply pump 140 is not available and/or needed.

Figure 6:
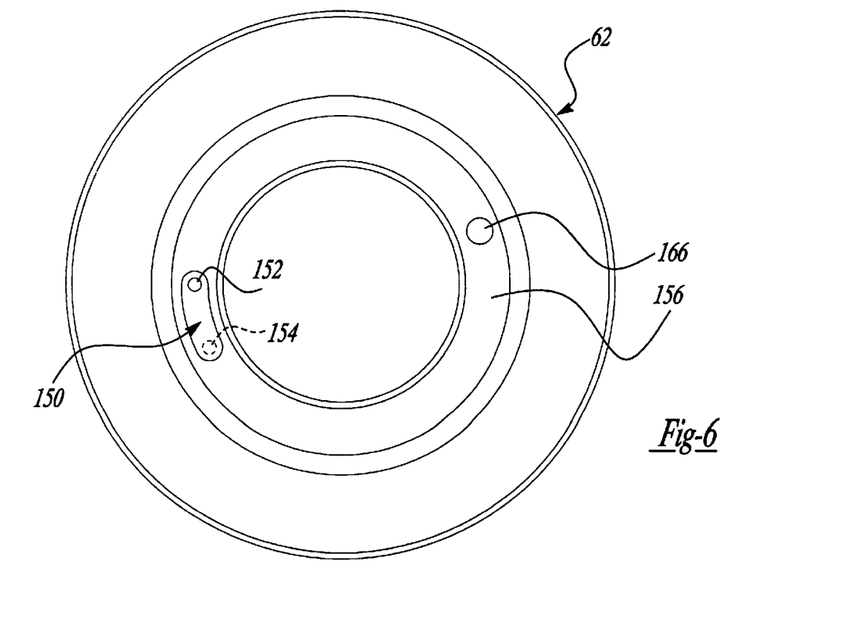
FIGS. 6 and 7 are opposite side views of the piston associated with the hydraulic coupling.

A valving arrangement is provided in association with piston 62 to provide a pressure relief function and a thermal unload function. In particular, the pressure relief function is provided by a pressure-sensitive valve 150 which is shown in FIG. 6 to be mounted by a rivet 152 to a face surface 156 of piston 62 for movement between a "closed" position and an "open" position relative to a discharge port 154 formed through piston 62 and which communicates with piston chamber 64. When the fluid pressure in piston chamber 64 is below a predetermined maximum pressure value, pressure-sensitive valve 150 is located in its closed position to block flow from piston chamber 64 into clutch chamber 56 through discharge port 154. However, when the pressure in piston chamber 64 exceeds this predetermined maximum value, pressure-sensitive valve 150 is forced to move from its closed position to its open position for permitting fluid flow from piston chamber 64 into clutch chamber 56. As such, a maximum pressure level is established and maintained within piston chamber 64 which, in turn, will define a maximum torque level that can be transferred by hydraulic coupling 10 between shafts 14 and 16. Once the pressure in piston chamber 64 is reduced below the maximum pressure level, pressure-sensitive valve 150 returns to its closed position for inhibiting further discharge of fluid from piston chamber 64. Pressure-sensitive valve 150 is preferably a reed-type valve element having a first end fixed by rivet 152 to face surface 156 of piston 62 and a second end overlying discharge port 154. The valve element has a spring rate adapted to maintain its second end in the closed position against face surface 156 until the maximum pressure level is reached in piston chamber 64 which causes the second end to deflect to the open position. It should be understood that other suitable pressure sensitive valves can be used in place of the reed-type construction shown.

Figure 7:
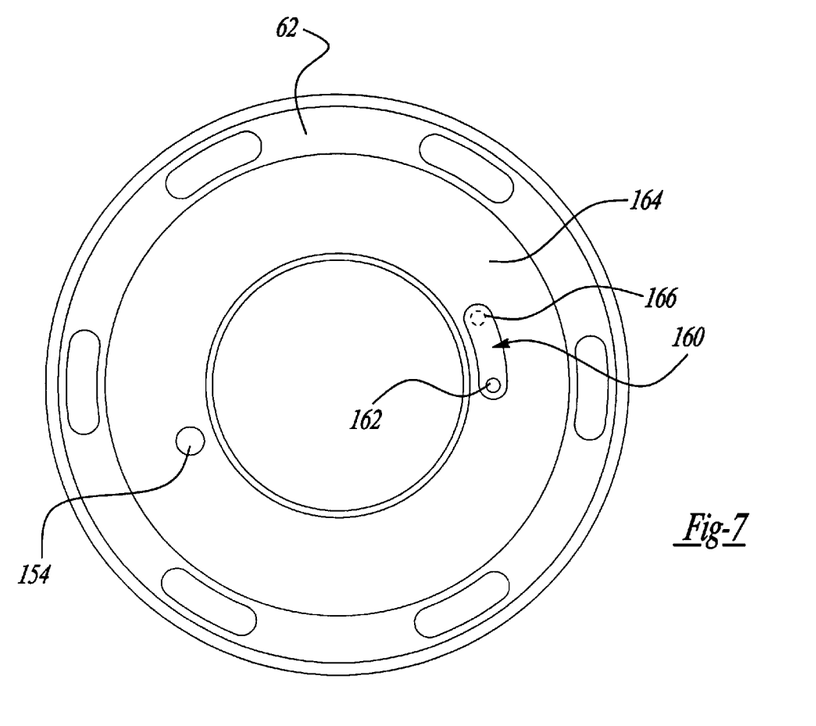

As noted, hydraulic coupling 10 also includes a thermal unload function which is operable to release the fluid pressure in piston chamber 64 when the temperature of the fluid therein exceeds a predetermined maximum temperature value. Such high temperature conditions may occur, for example, during continuous actuation of transfer clutch 22 for prolonged time periods. As shown in FIG. 7, a temperature-sensitive valve 160 is located within piston chamber 64 and is mounted by a rivet 162 to a face surface 164 of piston 62 for movement between a "closed" position and an "open" position relative to a dump port 166 formed through piston 62. Valve 160 is preferably a bimetallic valve element having a first end fixed by rivet 162 to piston 62 and a second end overlying dump port 166. The bimetallic valve element is made of two metallic strips laminated together which have different thermal expansion coefficients. As such, the second end of the bimetallic valve element is caused to move from its closed position to its open position relative to dump port 166 when the temperature of the fluid in piston chamber 64 exceeds the predetermined maximum temperature value. When the bimetallic valve element is in its open position, the flow of fluid from piston chamber 64 into clutch chamber 56 through dump port 166 causes a significant reduction in the fluid pressure within piston chamber 64, thereby functioning to de-actuate transfer clutch 22. However, once the fluid has cooled below the maximum temperature value, the bimetallic valve element returns to its closed position to permit re-engagement of transfer clutch 22. Again, any suitable temperature-sensitive valve can be used in place of the bimetallic valve disclosed.

Based on this disclosure, those skilled in the art should appreciate that a hydraulic coupling constructed according to the present invention can be used in motor vehicle driveline applications for limiting slip and transferring torque between two relatively rotatable members. In this regard, driveline apparatus 12 is intended to be indicative of, but not limited to, axle differentials, transaxles differentials, all-wheel drive power take-offs and in-line couplings, on-demand transfer cases and the like. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a motor vehicle driveline apparatus to rotatively couple first and second rotary members, the hydraulic coupling comprising:

a cover assembly fixed for rotation with the first rotary member and surrounding the second rotary member to define a clutch chamber and a supply chamber;

a transfer clutch located in said clutch chamber and including a clutch pack having a first clutch plate fixed for rotation with said cover assembly and a second clutch plate fixed for rotation with the second rotary member;

a piston housing defining a piston chamber;

a piston disposed in said piston chamber for movement relative to said clutch pack for exerting a clutch engagement force thereon the magnitude of which is a function of the fluid pressure in said piston chamber;

a hydraulic pump operative for pumping fluid from said supply chamber to said piston chamber in response to a speed differential between the first and second rotary members;

first and second flow paths between said piston chamber and said clutch chamber;

a pressure relief valve associated with said first flow path for permitting fluid flow from said piston chamber into said clutch chamber when the fluid pressure in said piston chamber reaches a predetermined pressure value; and a thermal unload valve associated with said second flow path for permitting fluid flow from said piston chamber to said clutch chamber when the fluid temperature in said piston chamber exceeds a predetermined temperature value.

2. The hydraulic coupling of claim 1 wherein said first flow path includes a discharge port formed through said piston which communicates with said piston chamber and said clutch chamber, and wherein said second flow path includes a dump port formed through said piston which communicates with said piston chamber and said clutch chamber.

3. The hydraulic coupling of claim 2 wherein said pressure relief valve is a pressure-sensitive valve element mounted to said piston for movement between first and second positions relative to said discharge port in response to the fluid pressure acting thereon, said pressure-sensitive valve element normally located in its first position to prevent fluid flow through said discharge port into said clutch chamber when the fluid pressure in said piston chamber is below said predetermined pressure value, and said pressure-sensitive valve element moves to its second position to permit fluid flow through said discharge port into said clutch chamber when the fluid pressure in said piston chamber reaches said predetermined pressure value.

4. The hydraulic coupling of claim 3 wherein said pressure-sensitive valve element is a reed valve having a first end secured to said piston and a second end overlying said discharge port for movement between said first and second positions.

5. The hydraulic coupling of claim 3 wherein said thermal unload valve is a temperature-sensitive valve element mounted to said piston for movement between first and second positions relative to said dump port in response to the fluid temperature in said piston chamber, said temperature-sensitive valve element is normally located in its first position to prevent fluid flow through said dump port into said clutch chamber when the fluid temperature is below said predetermined temperature value, and said temperature-sensitive valve element moves to its second position to permit fluid flow through said dump port into said clutch chamber when the fluid temperature reaches said predetermined temperature value.

6. The hydraulic coupling of claim 5 wherein said pressure-sensitive valve element is a bimetallic valve element having a first end secured to said piston and a second end overlying said dump port for movement between said first and second positions.

7. The hydraulic coupling of claim 1 further comprising a control valve regulating the flow of fluid between said piston chamber and said supply chamber, said control valve operable for limiting flow from said piston chamber to said supply chamber when the fluid pressure in said piston chamber exceeds a predetermined actuation value, thereby increasing the fluid pressure in said piston chamber and generating a clutch engagement force exerted by said piston on said clutch pack for actuating said transfer clutch.

8. The hydraulic coupling of claim 1 wherein said hydraulic pump includes a pump housing disposed between said cover assembly and the second rotary member, and a pump assembly located between said piston housing and said pump housing, said pump assembly including a first pump component fixed for rotation with said cover assembly and a second pump component fixed for rotation with the second rotary member.

9. A hydraulic coupling for rotatively coupling a first shaft and a second shift, comprising:

a cover assembly coupled for rotation with the first shaft;

a piston housing located between said cover assembly and the second shaft, said piston housing defining a piston chamber and an outlet port in fluid communication with said piston chamber;

a clutch pack disposed in a clutch chamber defined between said cover assembly and the second shaft, said clutch pack having a first plate fixed for rotation with said cover assembly and a second plate fixed for rotation with the second shaft;

a piston disposed in said piston chamber for movement relative to said clutch pack for exerting a clutch engagement force thereon the magnitude of which is a function of the fluid pressure in said piston chamber;

a hydraulic pump including a first pump component coupled for rotation with said cover assembly and a second pump component coupled for rotation with the second shaft, said hydraulic pump operative for pumping fluid into said outlet port in response to speed differentiation between said first and second pump components;

first and second flow paths between said piston chamber and said clutch chamber;

a pressure relief valve associated with said first flow path for permitting fluid flow from said piston chamber into said clutch chamber when the fluid pressure in said piston chamber reaches a predetermined pressure value; and a thermal unload valve associated with said second flow path for permitting fluid flow from said piston chamber to said clutch chamber when the fluid temperature in said piston chamber exceeds a predetermined temperature value.

10. The hydraulic coupling of claim 9 wherein said first flow path includes a discharge port formed through said piston which communicates with said piston chamber and said clutch chamber, and wherein said second flow path includes a dump port formed through said piston which communicates with said piston chamber and said clutch chamber.

11. The hydraulic coupling of claim 10 wherein said pressure relief valve is a pressure-sensitive valve element mounted to said piston for movement between first and second positions relative to said discharge port in response to the fluid pressure acting thereon, said pressure-sensitive valve element normally located in its first position to prevent fluid flow through said discharge port into said clutch chamber when the fluid pressure in said piston chamber is below said predetermined pressure value, and said pressure-sensitive valve element moves to its second position to permit fluid flow through said discharge port into said clutch chamber when the fluid pressure in said piston chamber reaches said predetermined pressure value.

12. The hydraulic coupling of claim 11 wherein said pressure-sensitive valve element is a reed valve having a first end secured to said piston and a second end overlying said discharge port for movement between said first and second positions.

13. The hydraulic coupling of claim 11 wherein said thermal unload valve is a temperature-sensitive valve element mounted to said piston for movement between first and second positions relative to said dump port in response to the fluid temperature in said piston chamber, said temperature-sensitive valve element is normally located in its first position to prevent fluid flow through said dump port into said clutch chamber when the fluid temperature is below said predetermined temperature value, and said temperature-sensitive valve element moves to its second position to permit fluid flow through said dump port into said clutch chamber when the fluid temperature reaches said predetermined temperature value.

14. The hydraulic coupling of claim 13 wherein said pressure-sensitive valve element is a bimetallic valve element having a first end secured to said piston and a second end overlying said dump port for movement between said first and second positions.

15. The hydraulic coupling of claim 9 further comprising a control valve regulating the flow of fluid between said piston chamber and a supply chamber, said control valve operable for limiting flow from said piston chamber to said supply chamber when the fluid pressure in said piston chamber exceeds a predetermined actuation value, thereby increasing the fluid pressure in said piston chamber and generating a clutch engagement force exerted by said piston on said clutch pack.

16. A hydraulic coupling for use in a driveline apparatus to rotatively couple first and second rotary member, comprising:

a transfer clutch disposed in a clutch chamber and operatively connected between the first and second rotary members;

a piston housing defining a piston chamber;

a piston disposed in said piston chamber and actuatable to engage said transfer clutch and rotatively couple the first and second rotary members;

a hydraulic pump for providing a pumping action in response to relative rotation between the first and second rotary members;

a first flow path for supplying hydraulic fluid from a supply chamber to said hydraulic pump;

a second flow path for supplying hydraulic fluid from said hydraulic pump to said piston chamber;

third and fourth flow paths for supplying hydraulic fluid from said hydraulic pump to said clutch chamber;

a pressure relief valve associated with said third flow path to permit fluid flow from said piston chamber into said clutch chamber when the fluid pressure in said piston chamber reaches a predetermined pressure value; and a thermal unload valve associated with said fourth flow path to permit fluid flow from said piston chamber into said clutch chamber when the fluid temperature exceeds a predetermined temperature value.

17. The hydraulic coupling of claim 16 wherein said first flow path includes a discharge port formed through said piston which communicates with said piston chamber and said clutch chamber, and wherein said second flow path includes a dump port formed through said piston which communicates with said piston chamber and said clutch chamber.

18. The hydraulic coupling of claim 17 wherein said pressure relief valve is a pressure-sensitive valve element mounted to said piston for movement between first and second positions relative to said discharge port in response to the fluid pressure acting thereon, said pressure-sensitive valve element normally located in its first position to prevent fluid flow through said discharge port into said clutch chamber when the fluid pressure in said piston chamber is below said predetermined pressure value, and said pressure-sensitive valve element moves to its second position to permit fluid flow through said discharge port into said clutch chamber when the fluid pressure in said piston chamber reaches said predetermined pressure value.

19. The hydraulic coupling of claim 18 wherein said pressure-sensitive valve element is a reed valve having a first end secured to said piston and a second end overlying said discharge port for movement between said first and second positions.

20. The hydraulic coupling of claim 18 wherein said thermal unload valve is a temperature-sensitive valve element mounted to said piston for movement between first and second positions relative to said dump port in response to the fluid temperature in said piston chamber, said temperature-sensitive valve element is normally located in its first position to prevent fluid flow through said dump port into said clutch chamber when the fluid temperature is below said predetermined temperature value, and said temperature-sensitive valve element moves to its second position to permit fluid flow through said dump port into said clutch chamber when the fluid temperature reaches said predetermined temperature value.

21. The hydraulic coupling of claim 20 wherein said pressure-sensitive valve element is a bimetallic valve element having a first end secured to said piston and a second end overlying said dump port for movement between said first and second positions.

22. The hydraulic coupling of claim 16 further comprising a fourth flow path between said piston chamber and said supply chamber, and a control valve regulating the flow of fluid in said fourth flow path, said control valve operable for limiting flow from said piston chamber to said supply chamber when the fluid pressure in said piston chamber exceeds a predetermined actuation value, thereby increasing the fluid pressure in said piston chamber to actuate said piston and engage said transfer clutch.

* * * * *